(12) United States Patent
Kwon et al.

(10) Patent No.: US 9,168,505 B2
(45) Date of Patent: Oct. 27, 2015

(54) CARBON DIOXIDE ADSORBENTS AND PRODUCTION METHODS THEREOF, CARBON DIOXIDE CAPTURE MODULE INCLUDING THE SAME, AND METHODS FOR SEPARATING CARBON DIOXIDE USING THE SAME

(71) Applicant: Samsung Electronics Co., Ltd., Suwon-Si, Gyeonggi-Do (KR)

(72) Inventors: Hyuk Jae Kwon, Suwon-si (KR); Soon Chul Kwon, Hwaseong-si (KR); Hyun Chul Lee, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/181,815

(22) Filed: Feb. 17, 2014

(65) Prior Publication Data

US 2014/0260977 A1     Sep. 18, 2014

(30) Foreign Application Priority Data

Mar. 15, 2013  (KR) .......................... 10-2013-0028226

(51) Int. Cl.
  *B01J 20/04*    (2006.01)
  *B01D 53/04*    (2006.01)
  *B01J 20/30*    (2006.01)

(52) U.S. Cl.
  CPC ............... *B01J 20/048* (2013.01); *B01D 53/04* (2013.01); *B01J 20/3085* (2013.01); *Y02C 10/04* (2013.01); *Y02C 10/08* (2013.01)

(58) Field of Classification Search
  CPC ..... B01D 53/04; B01J 20/048; B01J 20/3085; Y02C 10/04; Y02C 10/08
  See application file for complete search history.

(56) References Cited

U.S. PATENT DOCUMENTS

| 5,186,727 A * | 2/1993 | Chang ............................. 95/117 |
| 6,824,589 B2 * | 11/2004 | Watanabe et al. ............... 95/117 |
| 7,442,232 B2 | 10/2008 | White et al. |
| 2006/0144227 A1 | 7/2006 | White et al. |

(Continued)

FOREIGN PATENT DOCUMENTS

| KR | 2013-0072761 A | 7/2013 |
| KR | 2013-0089587 A | 8/2013 |

(Continued)

OTHER PUBLICATIONS

Colodrero, Rosario M.P. et al. "High Proton Conductivity in a Flexible, Cross-Linked, Ultramicroporous Magnesium Tetraphosphonate Hybrid Framework", Inorganic Chemistry (2012), 51(14), 7689-7698.

(Continued)

*Primary Examiner* — Christopher P Jones
(74) *Attorney, Agent, or Firm* — Harness, Dickey & Pierce, P.L.C.

(57) ABSTRACT

A carbon dioxide adsorbent may include an amorphous mixed metal oxide including a divalent first metal ($M^1$), a trivalent second metal ($M^2$) different from the divalent first metal ($M^1$), an alkali metal ($M^3$), and an element (A) with an electronegativity of about 2.0 to about 4.0. The alkali metal ($M^3$) may be present in the form of a crystalline halide, an oxide, or a combination thereof. The carbon dioxide adsorbent may also be used in a method of separating carbon dioxide.

20 Claims, 4 Drawing Sheets

(56) References Cited

U.S. PATENT DOCUMENTS

| | | |
|---|---|---|
| 2008/0226526 A1* | 9/2008 | Ronning et al. ............ 423/230 |
| 2013/0199373 A1 | 8/2013 | Kwon et al. |
| 2013/0236726 A1 | 9/2013 | Kwon et al. |
| 2013/0247757 A1 | 9/2013 | Lee et al. |
| 2013/0260990 A1 | 10/2013 | Kwon et al. |

FOREIGN PATENT DOCUMENTS

| | | |
|---|---|---|
| KR | 2013-0101936 A | 9/2013 |
| KR | 2013-0109061 A | 10/2013 |
| KR | 2013-0109830 A | 10/2013 |

OTHER PUBLICATIONS

Yasukawa, Akemi et al. "Preparation and characterization of magnesium-calcium hydroxyapatites" Journal of Materials Chemistry (1996), 6(8), 1401-1405.

Ebner, Armin E. et al. "Understanding the Adsorption and Desorption Behavior of $CO_2$ on a K-Promoted Hydrotalcite-like Compound (HTlc) through Nonequilibrium Dynamic Isotherms", Industrial & Engineering Chemistry Research (2006), 45(18), 6387-6392.

* cited by examiner

CARBON DIOXIDE ADSORBENTS AND PRODUCTION METHODS THEREOF, CARBON DIOXIDE CAPTURE MODULE INCLUDING THE SAME, AND METHODS FOR SEPARATING CARBON DIOXIDE USING THE SAME

CROSS-REFERENCE TO RELATED APPLICATION

This application claims priority under 35 U.S.C. §119 to Korean Patent Application No. 10-2013-0028226, filed in the Korean Intellectual Property Office on Mar. 15, 2013, the entire contents of which are incorporated herein by reference.

BACKGROUND

1. Field

Example embodiments herein relate to a carbon dioxide absorbent including an amorphous mixed metal oxide, a method of producing the same, a carbon dioxide capture module including the same, and a method of separating carbon dioxide using the same.

2. Description of the Related Art

A considerable increase in the concentration of global atmospheric $CO_2$, one of the greenhouse gases, has raised concern about climate change and has led to increasing efforts in research and development on control of $CO_2$ emissions. The main $CO_2$ emission sources include fossil fuel-based power plants, vehicles, and manufacturing plants for cement, limestone, hydrogen, ammonia, and the like. Capture and separation of carbon dioxide from fixed facilities such as various power plants or factories are considered as first measures for the control of $CO_2$ emissions. The capture of carbon dioxide refers to a process of physically or chemically separating $CO_2$ from a gas mixture exhausted from chemical reactions or combustion of fossil fuels. Among solid powder materials being used for capturing $CO_2$ by adsorption are carbon materials, zeolites, metal-organic framework (MOF)/zeolitic-imidazolate framework (ZIF), hydrotalcite, and metal oxides. The carbon materials, zeolites, and MOF/ZIF show a certain level of adsorption efficiency at a relatively low temperature of from 0° C. to room temperature, and the metal oxides show a certain level of adsorption efficiency at a relatively high temperature of 500° C. or higher. Hydrotalcite is one of adsorbents that can be used at a middle temperature range of 150° C. to 400° C., but its adsorption capacity is only about 1 to 2 wt %. Among fixed $CO_2$-emission facilities emitting a considerable amount of carbon dioxide are fossil fuel-based power plants (e.g., an integrated gasification combined cycle (IGCC) system or a thermoelectric power plant) and natural gas wells. In order to address cost-related issues, power plants emitting a relatively large amount of carbon dioxide require adsorbent materials that may adsorb carbon dioxide at a relatively high temperature, for example, about 200° C. to 550° C.

SUMMARY

Some example embodiments relate to a carbon dioxide adsorbent capable of adsorbing carbon dioxide at a relatively high level of efficiency.

Some example embodiments relate to a method of producing the carbon dioxide adsorbent.

Some example embodiments relate to a carbon dioxide capturing module including the carbon dioxide adsorbent.

Some example embodiments relate to a method of separating carbon dioxide that includes bringing the carbon dioxide adsorbent into contact with a gas mixture containing carbon dioxide.

According to one example embodiment, a carbon dioxide absorbent may include an amorphous mixed metal oxide including a divalent first metal ($M^1$), a trivalent second metal ($M^2$) different from the divalent first metal ($M^1$), an alkali metal ($M^3$), and an element (A) with an electronegativity of about 2.0 to about 4.0, wherein the alkali metal ($M^3$) is present in the form of a crystalline halide, an oxide, or a combination thereof.

The crystalline halide of the alkali metal ($M^3$) may be supported on the surface of the mixed metal oxide composite.

The divalent first metal ($M^1$) may be selected from an alkaline-earth metal, a transition metal, and a combination thereof.

The trivalent second metal ($M^2$) may be selected from a Group 13 element of the IUPAC periodic table, a transition metal, a lanthanide, and a combination thereof.

A mole ratio ($M^1/M^2$) between the first metal ($M^1$) and the second metal ($M^2$) may be in a range of about 1.45/1 to about 4/1.

The element with the electronegativity of about 2.0 to about 4.0 may be selected from phosphorus (P), boron (B), fluorine (F), sulfur (S), chlorine (Cl), and a combination thereof.

The alkali metal may be Li, Na, K, Rb, Cs, Fr, or a combination thereof.

The mixed metal oxide may be represented by Chemical Formula 1.

$$[M^1_a M^2_b M^3_c A_d]O_x \qquad \text{[Chemical Formula 1]}$$

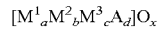

In Chemical Formula 1, $M^1$ is a divalent first metal, $M^2$ is a trivalent second metal, $M^3$ is an alkali metal, A is an element having an electronegativity of about 2.0 to about 4.0, a is about 0.25 to about 0.60, b is about 0.1 to about 0.40, c is 0 to about 0.30, and d is about 0.05 to about 0.45, wherein a, b, c, and d are mole fractions, a+b+c+d equals 1, and x is a number necessary for charge balancing between oxygen and $M^1$, $M^2$, $M^3$, and A. The amount of the alkali metal ($M^3$) may be in a range of about 1 to about 30 mole % based on a total amount of the first metal ($M^1$) and the second metal ($M^2$).

The halide of the alkali metal ($M^3$) may be LiCl, NaCl, KCl, RbCl, CsCl, or FrCl, and the crystalline halide of the alkali metal ($M^3$) may be supported on the surface of the mixed metal oxide composite.

According to another non-limiting embodiment, a method of producing a carbon dioxide adsorbent including an amorphous mixed metal oxide including a divalent first metal ($M^1$), a trivalent second metal ($M^2$) different from the divalent first metal ($M^1$), an alkali metal ($M^3$), and an element (A) with an electronegativity of about 2.0 to about 4.0, the method including dissolving a salt of a divalent first metal ($M^1$) and a salt of a trivalent second metal ($M^2$) in water to prepare an aqueous solution of metal salts; adjusting a pH of the aqueous solution of the metal salts to be basic to form a precipitate; separating the precipitate; treating the precipitate with an aqueous solution of a salt including an element having an electronegativity of about 2.0 to about 4.0 and an aqueous solution of an alkali metal ($M^3$) salt to form an ion-exchanged mixed metal hydroxide; separating the ion-exchanged mixed metal hydroxide; and calcining the ion-exchanged mixed metal hydroxide to obtain a mixed metal oxide composite.

According to still another non-limiting embodiment, a method of producing a carbon dioxide adsorbent including an amorphous mixed metal oxide including a divalent first metal ($M^1$), a trivalent second metal ($M^2$) different from the divalent first metal ($M^1$), an alkali metal ($M^3$), and an element (A) with an electronegativity of about 2.0 to about 4.0 is provided, wherein the alkali metal ($M^3$) is present in the form of a crystalline halide, an oxide, or a combination thereof, the method including dissolving a salt of a divalent first metal ($M^1$) and a salt of a trivalent second metal ($M^2$) in water to prepare an aqueous solution of metal salts; adjusting a pH of the aqueous solution of the metal salts to be basic to form a precipitate; separating the precipitate; treating the precipitate with an aqueous solution of a salt including an element having an electronegativity of about 2.0 to about 4.0 to form an ion-exchanged mixed metal hydroxide; separating the ion-exchanged mixed metal hydroxide; calcining the ion-exchanged mixed metal hydroxide to obtain a calcined product; and treating the calcined product with an aqueous solution of an alkali metal ($M^3$).

The salt of the divalent first metal ($M^1$) may be selected from nitrates, acetates, and hydrates thereof, and the salt of the trivalent second metal ($M^2$) may be selected from nitrates, acetates, and hydrates thereof.

The salt including an element (A) having an electronegativity of about 2.0 to about 4.0 may be a salt including an anion selected from a phosphate ion ($PO_4^{3-}$), a borate ion ($BO_3^{3-}$), a sulfate ion ($SO_4^{2-}$), a peroxosulfate ion ($S_2O_8^{2-}$), a chloride ion ($Cl^-$), a chlorate ion ($ClO_3^-$), a perchlorate ion ($ClO_4^-$), a fluoride ion ($F^-$), and a combination thereof.

The salt of the alkali metal may include Li, Na, K, Rb, Cs, or Fr, and may be a halide, a hydroxide, a nitrate, an acetate, or a hydrate thereof.

The aqueous solution of the salt including an element having an electronegativity of about 2.0 to about 4.0 and the aqueous solution of the salt of the alkali metal ($M^3$) may have pH of less than or equal to about 7.

The treating of the precipitate or the calcined product with the aqueous solution of the salt including an element having an electronegativity of about 2.0 to about 4.0 and/or the aqueous solution of the salt of the alkali metal ($M^3$) may include mixing the precipitate or the calcined product with the aqueous solution of the salt including an element having an electronegativity of about 2.0 to about 4.0 and/or the aqueous solution of the salt of the alkali metal ($M^3$), and stirring a obtained mixture at a temperature of about 20° C. to about 150° C.

The calcination may be conducted in air or in an oxygen-containing atmosphere at a temperature of about 200° C. to about 700° C.

According to still another non-limiting embodiment, a carbon dioxide capture module may include a carbon dioxide adsorbent that includes an amorphous mixed metal oxide including a divalent first metal ($M^1$), a trivalent second metal ($M^2$) different from the divalent first metal ($M^1$), an alkali metal ($M^3$), and an element (A) with an electronegativity of about 2.0 to about 4.0, wherein the alkali metal ($M^3$) is present in the form of a crystalline halide, an oxide, or a combination thereof.

According to still another non-limiting embodiment, a method of separating carbon dioxide may include bringing a gas mixture containing carbon dioxide into contact with a carbon dioxide adsorbent that includes an amorphous mixed metal oxide including a divalent first metal ($M^1$), a trivalent second metal ($M^2$) different from the divalent first metal ($M^1$), an alkali metal ($M^3$), and an element (A) with an electronegativity of about 2.0 to about 4.0, wherein the alkali metal ($M^3$) is present in the form of a crystalline halide, an oxide, or a combination thereof.

The method of separating carbon dioxide may further include heat-treating the carbon dioxide adsorbent at a temperature of about 50° C. to about 500° C., optionally under a reduced pressure, to desorb the carbon dioxide.

The gas mixture may further include at least one gas selected from hydrogen, nitrogen, and methane.

A mixed metal oxide $CO_2$ adsorbent may adsorb carbon dioxide with relatively high efficiency in a wide range of temperatures including a middle temperature range.

DETAILED DESCRIPTION

Figure 1:
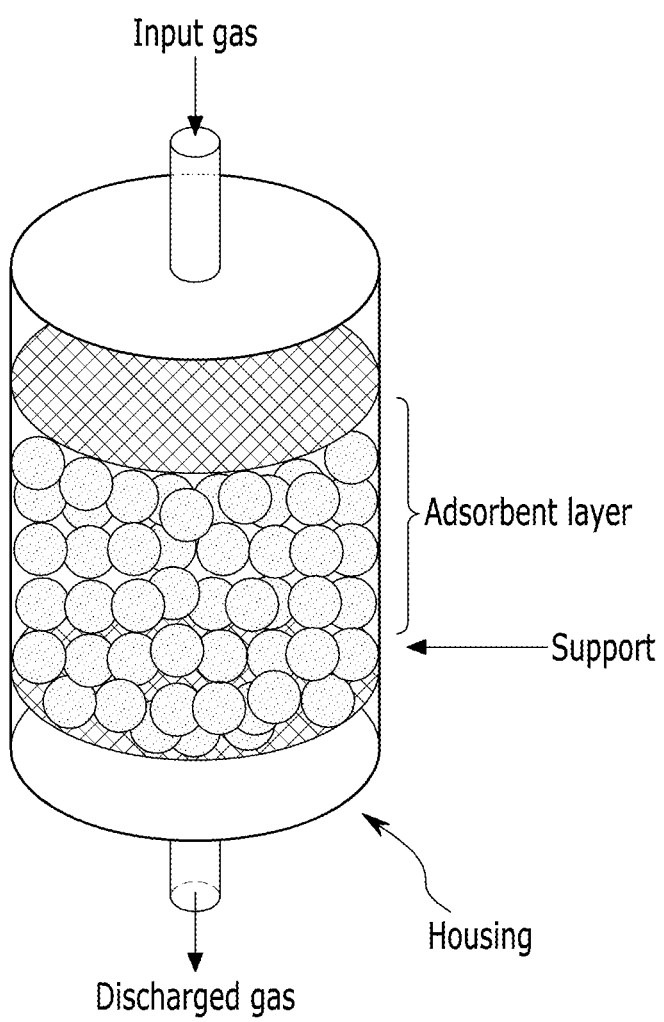
FIG. 1 illustrates a schematic view of the carbon dioxide capture module according to an example embodiment.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, the term "supporting" refers to affixing a substance to be supported to a support, for example, by means of hydrothermal treatment, impregnation, and/or calcination.

As used herein, the term "input gas stream" refers to a gas stream prior to passing through an adsorbent region or prior to initial contact with an adsorbent.

According to one example embodiment of the present disclosure, a carbon dioxide adsorbent includes an amorphous mixed metal oxide including a divalent first metal ($M^1$), a trivalent second metal ($M^2$) different from the divalent first metal ($M^1$), an alkali metal ($M^3$), and an element (A) with an electronegativity of about 2.0 to about 4.0, wherein the alkali metal ($M^3$) is present in the form of a crystalline halide, an oxide, or a combination thereof.

The divalent first metal ($M^1$) may be selected from an alkaline-earth metal, a transition element, and a combination thereof. Examples of the divalent first metal ($M^1$) may include magnesium (Mg), calcium (Ca), strontium (Sr), nickel (Ni), manganese (Mn), iron (Fe), cobalt (Co), copper (Cu), zinc (Zn), and beryllium (Be). It is possible to use at least one of the foregoing metals as the first metal ($M^1$). The trivalent second metal ($M^2$) may be selected from a Group 13 element in the IUPAC periodic table, a transition element, a lanthanide, and a combination thereof. Examples of the trivalent second metal ($M^2$) may include aluminum (Al), chromium (Cr), manganese (Mn), iron (Fe), cobalt (Co), lanthanum (La), cerium (Ce), gallium (Ga), indium (In), and vanadium (V). It is possible to use at least one of the foregoing metals as the second metal ($M^2$). The trivalent second metal ($M^2$) may play a role of providing a passage for facilitating charge transfer to the first metal.

In the mixed metal oxide, the first metal ($M^1$) and the second metal ($M^2$) are different from each other. The mole ratio between the first metal ($M^1$) and the second metal ($M^2$) (the mole number of the first metal ($M^1$)/the mole number of the second metal ($M^2$)) may range from about 1.45/1 to about 4/1, for example, about 1.5/1 to about 4/1, or about 1.7/1 to about 4/1. When the first metal is included in such a higher mole ratio than the second metal, the alkaline properties of the first metal may dominate the resulting mixed metal oxide, thereby enhancing $CO_2$ adsorption capacity thereof.

The element (A) with an electronegativity of about 2.0 to about 4.0 may be selected from phosphorus (P), boron (B), fluorine (F), sulfur (S), chlorine (Cl), and a combination thereof. Inclusion of the element (A) in a mixed metal oxide may increase the polarity of the mixed metal oxide surface and thus improve $CO_2$ adsorption capacity. The electronegativity of the element (A) may be in a range of about 3.0 to about 4.0. The presence of the element (A) having an electronegativity within the foregoing range may result in sufficiently increased polarity of the mixed metal oxide surface. The element (A) having an electronegativity of about 2.0 to about 4.0 may be included in an amount of about 6 to about 90%, for example, about 10 to about 80%, or about 20 to about 80% based on a total (mole) amount of the metals (the sum of a divalent first metal $M^1$ and a trivalent second metal $M^2$). When the amount of the element (A) is within the aforementioned range, the mixed metal oxide may exhibit sufficient polarity.

The mixed metal oxide may be represented by Chemical Formula 1.

$$[M^1{}_aM^2{}_bM^3{}_cA_d]O_x$$ 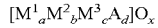 [Chemical Formula 1]

In Chemical Formula 1, $M^1$ is a first divalent metal, $M^2$ is a second trivalent metal, $M^3$ is an alkali metal, A is an element having an electronegativity of about 2.0 to about 4.0, a is about 0.25 to about 0.60, for example about 0.3 to about 0.55, b is about 0.1 to about 0.40, for example about 0.1 to about 0.35, or about 0.15 to about 0.30, c is 0 to about 0.30, for example about 0.001 to about 0.18, about 0.05 to about 0.18, or about 0.1 to about 0.18, and d is about 0.05 to about 0.45, for example about 0.1 to about 0.40, or about 0.2 to about 0.40, wherein a, b, c, and d represent a mole fraction of each element, a+b+c+d equals 1, and x is a number necessary for charge-balancing between oxygen and $M^1$, $M^2$, $M^3$, and A.

The mixed metal oxide has an amorphous structure exhibiting a broad peak in XRD diffraction analysis. As the mixed metal oxide has the amorphous structure, it has an increased specific surface area, for example, of about 20 $m^2/g$ to about 100 $m^2/g$, or about 50 $m^2/g$ to about 150 $m^2/g$, thereby showing enhanced $CO_2$ adsorption performance. The mixed metal oxide may have a pore volume of about 0.4 $cm^3/g$ to 0.8 $cm^3/g$, and a pore diameter of about 10 nm to 30 nm.

In the mixed metal oxide, the alkali metal ($M^3$) may exist in the form of an oxide, in the form of a crystalline halide supported on its surface, or in a combined form thereof. The alkali metal may be Li, Na, K, or a combination thereof. The alkali metal halide may be LiCl, NaCl, KCl, KCl, RbCl, CsCl, or FrCl. The amount of alkali metal included in the form of an oxide and a halide may range from about 1 mol % to about 30 mol % based on the total amount of the first metal and the second metal. The alkali metal may provide additional adsorption sites for carbon dioxide, thereby allowing the resulting mixed metal oxide to exhibit higher adsorption capacity.

When being used as an adsorbent in a middle temperature range, hydrotalcite shows adsorption capacity of at most about 1 to 2 wt % (about 0.3 to about 0.5 mmol $CO_2$/g of the adsorbent) at an adsorption temperature of 200° C. to 300° C. under normal pressure. By contrast, the amorphous mixed metal oxide of Chemical Formula I has an alkali metal oxide and/or an alkali metal halide together with an element such as phosphorous, sulfur, and boron in addition to the divalent metal and the trivalent metal, and thus when it is used as an adsorbent at a middle temperature range of about 200° C. to 400° C., the amorphous mixed metal oxide may exhibit enhanced $CO_2$ adsorption capacity, for example, at least 10 times higher than that of hydrotalcite.

In another non-limiting example embodiment, a method of producing a carbon dioxide adsorbent including an amorphous mixed metal oxide including a divalent first metal ($M^1$), a trivalent second metal ($M^2$) different from the divalent first metal ($M^1$), an alkali metal ($M^3$), and an element (A) with an electronegativity of about 2.0 to about 4.0 may include dissolving a salt of a divalent first metal ($M^1$) and a salt of a trivalent second metal ($M^2$) in water to prepare an aqueous solution of the metal salts; adjusting a pH of the aqueous solution of the metal salts to be basic in order to form a precipitate; separating the precipitate; treating the precipitate with an aqueous solution of a salt including an element having an electronegativity of about 2.0 to about 4.0 and an aqueous solution of an alkali metal ($M^3$) salt to form an ion-exchanged mixed metal hydroxide; separating the ion-exchanged mixed metal hydroxide; and calcining the ion-exchanged mixed metal hydroxide to obtain a metal oxide composite.

The salt of a divalent first metal ($M^1$) may be selected from nitrates of the first metal, acetates of the first metal, and hydrates thereof. The salt of a trivalent second metal ($M^2$) may be selected from nitrates of the second metal, acetates of the second metal, and hydrates thereof. The aforementioned salt may facilitate an ion-exchange process of a hydroxide ion included in the precipitate (i.e., a layered double metal hydroxide) with an anion of the salt including an element (A) having an electronegativity of about 2.0 to 4.0.

The pH of the aqueous solution of (mixed) metal salts may be adjusted to be basic by using an aqueous solution of an alkali. For example, the aqueous solution of the metal salts is adjusted to have pH of 9 or higher, for example, about 9 to about 12. Examples of the alkali may include, but are not limited to, KOH, NaOH, and ammonium hydroxide. The pH adjusting may bring forth the generation of precipitates (i.e., the layered double metal hydroxide) from the aqueous solution of (mixed) metal salts.

If desired, the obtained precipitates may be aged while stirring. The conditions for the aging are not particularly limited. By way of an example, the aging may be carried out at a temperature of higher than or equal to 20° C. (e.g., room temperature) for about 60 minutes or longer. The precipitate thus formed may be separated by means of centrifugation, filtration, or the like.

The separated precipitates are treated with an aqueous solution of a salt including an element (A) with an electronegativity of about 2.0 to about 4.0 and an aqueous solution of an alkali metal salt to prepare an ion-exchanged mixed metal hydroxide.

The salt including an element with an electronegativity of about 2.0 to about 4.0 may be a salt including an anion selected from a phosphate ion ($PO_4^{3-}$), a borate ion ($BO_3^{3-}$), a sulfate ion ($SO_4^{2-}$), a peroxosulfate ion ($S_2O_8^{2-}$), a chloride ion ($Cl^-$), a chlorate ion ($ClO_4^-$), a fluoride ion ($F^-$), and a combination thereof. The salt including an element with an electronegativity of about 2.0 to about 4.0 may include a cation selected from $K^+$, $Ca^{2+}$, $NH_4^+$, $Na^+$, and a combination thereof. Examples of the salt including an element with an electronegativity of about 2.0 to about 4.0 may include, but are not limited to, $KH_2PO_4$, $K_2HPO_4$, $CaHPO_4$, $(NH_4)H_2PO_4$, $(NH_4)_2HPO_4$, $NaH_2PO_4$, $Na_2HPO_4$, $KH_2BO_3$, $K_2HBO_3$, $CaHBO_3$, $(NH_4)H_2BO_3$, $(NH_4)_2HBO_3$, $NaH_2BO_3$, $Na_2HBO_3$, $K_2BO_4$, $KHSO_4$, $CaSO_4$, $(NH_4)_2SO_4$, $(NH_4)HSO_4$, $Na_2SO_4$, $NaHSO_4$, $K_2S_2O_8$, $(NH_4)_2S_2O_8$, $Na_2S_2O_8$, $CaCl_2$, $NH_4Cl$, $KClO_4$, $NH_4ClO_4$, $NaClO_4$, $KHF_2$, $CaF_2$, $NH_4F$, $NH_4HF_2$, and $NaHF_2$. At least one compound may be used as the salt including the element (A) with an electronegativity of about 2.0 to about 4.0.

The alkali metal salt may be a halide, a hydroxide, a nitrate, an acetate, or a hydrate thereof. Examples of the alkali metal salt may include, but are not limited to, LiCl, NaCl, KCl, LiF, NaF, and KF. At least one compound may be used as the alkali metal salt.

The precipitate may be treated with the aqueous solution of the salt including an element (A) with an electronegativity of about 2.0 to about 4.0 and the aqueous solution of the alkali metal salt at the same time or in any order. For example, the precipitate may be mixed with an aqueous solution including both of the salt including the element (A) and the alkali metal salt and then be stirred therein. Alternatively, the precipitate may be separately treated (stirred) in any order with (in) the aqueous solution of the salt including an element (A) and the aqueous solution of the alkali metal salt, and each solution may be prepared separately. For example, the precipitate may be first added to an aqueous solution of the salt including the element (A) to conduct an ion-exchange process and then added to an aqueous solution of the alkali metal salt. Such a treating order may be reversed. The treating conditions are not particularly limited. By way of an example, the treating may be conducted at a temperature of about 20° C. or higher, for example, from about room temperature to about 150° C. for 60 minutes or longer, or for about 3 hours to about 24 hours. During such a treatment, ion-exchange, impregnation, hydro-thermal treatment, or the like may occur.

During such a treatment, the pH of the aqueous solutions of the salt containing the element (A) and/or the alkali metal salt may be adjusted to less than or equal to about 7, for example about 3 to about 7. A weak acid compound may be used to adjust the pH. Examples of the weak acid compound include, but are not limited to, acetic acid, formic acid, phosphoric acid, and oxalic acid. When the salt including the element (A) (e.g. $KH_2PO_4$) and/or the alkali metal salt provides an aqueous solution having pH of less than or equal to 7, the pH adjustment may be made without using an additional pH controlling compound such as the weak acid. In such a treatment, the concentration of the aqueous solution of the salt containing the element (A) and/or the alkali metal salt are not particularly limited, and may be chosen as desired. By way of an example, the concentration of the aqueous solution may be greater than or equal to about 0.01 M, for example, from about 0.05 M to about 5 M.

The aforementioned treatment may prepare a mixed metal hydroxide containing a divalent first metal ($M^1$), a trivalent second metal ($M^2$), an alkali metal ($M^3$), and an element (A) with an electronegativity of about 2.0 to about 4.0.

The mixed metal hydroxide is an ion-exchanged product prepared by replacing some of the anions of the divalent metal salt and the anions of the trivalent metal salt with anions of an element having an electronegativity of about 2 to about 4. The mixed metal hydroxide does not include carbonate anions as the anions of the divalent metal salt and the trivalent metal salt. Therefore, unlike hydrotalcite having a conventional layered structure, the mixed metal hydroxide does not include any carbonate anions ($CO_3^{-2}$), and the anions contained in the divalent metal salt and the trivalent metal salt (e.g., the nitrate anions, the acetate anions, and the like) may be easily ion-exchanged with the anions of an element having an electronegativity of about 2.0 to about 4.0.

The mixed metal hydroxide thus formed may be separated by using suitable means such as simple filtration, centrifugation, and the like.

The separated mixed metal hydroxide is calcined and provided as an amorphous mixed metal oxide including a divalent first metal ($M^1$), a trivalent second metal ($M^2$), an alkali metal ($M^3$), and an element (A) with an electronegativity of about 2.0 to about 4.0. The mixed metal oxide may be represented by Chemical Formula I, and details for the mixed metal oxide are the same as set forth above. The calcination may be conducted at a temperature of about 200° C. to about 700° C., for example, about 300° C. to about 500° C., or about 400° C. to about 500° C. The calcination may be conducted in air or in an oxygen-containing atmosphere. The calcination time is not particularly limited, and for example, it may range from about 30 minutes to 50 hours, or about 1 hour to 20 hours. The calcination under the aforementioned conditions may result in higher adsorption capacity for the resulting amorphous mixed metal oxide.

In another example embodiment, a method of producing a carbon dioxide adsorbent including an amorphous mixed metal oxide including a divalent first metal ($M^1$), a trivalent second metal ($M^2$) different from the divalent first metal ($M^1$), an alkali metal ($M^3$), and an element (A) with an electronegativity of about 2.0 to about 4.0, wherein the alkali metal ($M^3$) is present in the form of a crystalline halide, an oxide, or a combination thereof, may include dissolving a salt of a divalent first metal ($M^1$) and a salt of a trivalent second metal ($M^2$) in water to prepare an aqueous solution of metal salts; adjusting pH of the aqueous solution of the metal salts to be basic to form a precipitate; separating the precipitate; treating the precipitate with an aqueous solution of a salt including an element with an electronegativity of about 2.0 to about 4.0 to form an ion-exchanged mixed metal hydroxide; separating the ion-exchanged mixed metal hydroxide; calcining the ion-exchanged mixed metal hydroxide to obtain a calcined product; and treating the calcined product with an aqueous solution of an alkali metal ($M^3$) salt.

A crystalline halide of the alkali metal ($M^3$) is supported on the surface of the amorphous mixed metal oxide.

Preparation of the aqueous solutions of the first metal salt and the second metal salt, formation of the precipitate, and separation of the precipitate are the same as set forth above.

The separated precipitate is treated with an aqueous solution of the salt including an element (A) with an electronegativity of about 2.0 to about 4.0 to prepare an ion-exchanged mixed metal hydroxide. Details for the aqueous solution of the salt including the element (A) are the same as set forth above. By such a treatment, the hydroxide ion of the precipitate (i.e., LDH) may be ion-exchanged with the anion of the salt including the element (A) to form an ion-exchanged mixed metal hydroxide. The conditions for such a treatment including temperature, time, and pH, and the details for the mixed metal hydroxide, are the same as set forth above.

The ion-exchanged mixed metal hydroxide is separated and subjected to calcination. Details for the separation and the calcination are the same as set forth above. The calcination produces an amorphous mixed metal oxide including the divalent first metal ($M^1$), the trivalent second metal ($M^2$), and an element (A) with an electronegativity of about 2.0 to about 4.0 as a calcined product.

The calcined product thus obtained is treated with an aqueous solution of an alkali metal salt. Details for the aqueous solution of the alkali metal salt and the specific conditions for the treatment (e.g., time, temperature, and the like) are the same as described above. When the calcined product is treated with the aqueous solution of the alkali metal salt, the pH of the aqueous solution may be less than or equal to about 7.

The calcined product being treated with the aqueous solution of the alkali metal salt may be subjected to re-calcination after it is separated from the aqueous solution. Details for the conditions for the recalcination are the same as set forth in the calcination.

According to another example embodiment, a method of separating carbon dioxide is provided, which includes bringing a gas mixture containing carbon dioxide into contact with a carbon dioxide adsorbent that includes an amorphous mixed metal oxide including a divalent first metal ($M^1$), a trivalent second metal ($M^2$) different from the divalent first metal ($M^1$), an alkali metal ($M^3$), and an element (A) with an electronegativity of about 2.0 to about 4.0, wherein the alkali metal ($M^3$) is present in the form of a crystalline halide, an oxide, or a combination thereof.

Details for the carbon dioxide adsorbent are the same as set forth above. Besides carbon dioxide, the gas mixture may further include hydrogen, nitrogen, hydrocarbons (e.g., methane), or a combination thereof. The contact of the gas mixture with the carbon dioxide adsorbent may be conducted at a temperature of about 25° C. or higher, for example about 30° C. to 500° C. The carbon dioxide adsorbent as set forth above may exhibit a high level of adsorption capacity not only at a low temperature but also at a high temperature such as about 200° C. to about 400° C.

The method of separating carbon dioxide may further include heat-treating the carbon dioxide adsorbent at a temperature of about 50° C. to about 500° C., optionally under reduced pressure, to desorb carbon dioxide and emit the same. The desorption pressure is not particularly limited, but it may be in a range of less than or equal to about 1000 Pa, and specifically about 700 Pa to about 50 Pa, for example, about 100 Pa.

The carbon dioxide adsorbent may be used in the form of a carbon dioxide capture module. Referring to FIG. 1, the carbon dioxide capture module according to an embodiment includes an adsorption layer including the carbon dioxide adsorbent, a support plate holding the adsorption layer, and a housing including an inlet for an input gas stream and an outlet for the treated gas stream. Details for the carbon dioxide adsorbent may be the same as set forth above. The thickness of the adsorption layer is not particularly limited, but may be greater than or equal to about 0.2 cm, and specifically from about 0.5 cm to about 3 cm. The support plate may be made of any materials as long as it can support the adsorbent while allowing the flow of the input gas. Examples of the material may include quartz wool or the like. Materials and shapes of the housing for the module are not particularly limited, but may be selected as desired. By way of non-limiting examples, the housing may be made of stainless steel, copper pipe, or quartz pipe, and may have a shape of cylinder, a prism, a square column, or the like.

The gas mixture containing carbon dioxide may be an input gas stream containing carbon dioxide. The gas mixture containing carbon dioxide may further include at least one gas selected from hydrogen, nitrogen, and methane. The composition of the input gas stream is not particularly limited, but may be appropriately selected as needed. For example, the gas mixture containing carbon dioxide may include carbon dioxide and nitrogen like a flue gas generated from a fossil fuel power plant. The input gas stream may include carbon dioxide and hydrogen like a flue gas generated from an integrated gasification combined cycle (IGCC) power plant. The input gas stream may include carbon dioxide and methane like a gas generated from a natural gas well. The flow rate of supplying the input gas stream is not particularly limited, but may be appropriately selected as desired. For example, the flow rate may be less than or equal to about 1000 ml/min, and specifically, less than or equal to about 500 ml/min.

As set forth above, the aforementioned adsorbent for carbon dioxide may adsorb carbon dioxide at high efficiency even at a high temperature of 200° C. or higher. In addition, the amorphous mixed metal oxide is thermally stable so that even after 10 adsorption/desorption cycles (adsorption at 200° C. and desorption at 200° C. under 1 bar), the decrease in $CO_2$ adsorption capacity of the adsorbent is less than about 10%, for example less than about 8%, or less than about 5%.

The following illustrate one or more embodiments of the present disclosure in detail. However, it should be understood that the following are merely examples, and this disclosure is not limited thereto.

EXAMPLES

Preparation of CO2 Adsorbent and its Characterization

Preparation Example 1

Aluminum nitrate $(Al(NO_3)_3 \cdot 9H_2O)$ and magnesium nitrate $(Mg(NO_3)_2 \cdot 6H_2O)$ as precursors are dissolved in 200 ml of water to prepare a mixed aqueous solution of metal salts. The amounts of the precursors are controlled so that the mole ratio between the two metals (Al:Mg) is 1:3. In addition, NaOH is dissolved in water to obtain 100 ml of a 1 M NaOH aqueous solution. The mixed aqueous solution of metal salts is mixed with the NaOH aqueous solution to form precipitates. At this time, the pH of the resulting aqueous solution is set to be about 9.5 to about 10.5. The precipitates thus formed are aged under vigorous stirring at room temperature of 25° C. for 24 hours. After being aged, the precipitates are filtered through centrifugation (8000 RPM, 10 minutes) and washed with distilled water three times, and then filtered and dried for one day. 1 g of the dried precipitates is added to a mixed solution of 100 ml of a 0.1 M $KH_2PO_4$ aqueous solution and 100 ml of a 0.1 M KCl aqueous solution. The resulting mixture is subjected to vigorous stirring at room temperature for 24 hours, and then is filtered, washed, and dried at room temperature of 25° C.

The dried powder is calcined at 400° C. for 5 hours in air to obtain a mixed metal oxide including Mg, Al, P, and $K[Mg_{0.47}Al_{0.27}P_{0.25}K_{0.01}]O_x$ (wherein x is a number for charge-balancing between oxygen and other elements). In this example, distilled water is used after being decarbonated by bubbling nitrogen into the flask to remove $CO_2$.

Preparation Example 2

A mixed metal oxide including Mg, Al, P, and $K[Mg_{0.51}Al_{0.19}P_{0.27}K_{0.03}]O_x$ (wherein x is a number for charge-balancing between oxygen and other elements) is obtained in the same manner as set forth in Preparation Example 1, except that 1 g of the dried precipitate powders are added to a mixture of 100 ml of a 0.1 M $KH_2PO_4$ aqueous solution and 100 ml of a 0.1 M KCl aqueous solution and then subjected to vigorous stirring at 80° C. for 24 hours.

Preparation Example 3

A mixed metal oxide including Mg, Al, P, and $K[Mg_{0.46}Al_{0.16}P_{0.34}K_{0.04}]O_x$ (wherein x is a number for charge-balancing between oxygen and other elements) is obtained in the same manner as set forth in Preparation Example 1, except that 1 g of the dried precipitate powders are added to a mixture of 100 ml of a 0.1 M $KH_2PO_4$ aqueous solution and 100 ml of a 0.1 M KCl aqueous solution and then subjected to vigorous stirring at 120° C. for 24 hours.

Preparation Example 4

A mixed metal oxide including Mg, Al, P, and $K[Mg_{0.38}Al_{0.21}P_{0.37}K_{0.04}]O_x$ (wherein x is a number for charge-balancing between oxygen and other elements) is obtained in the same manner as set forth in Preparation Example 1, except that 1 g of the dried precipitate powders are added to 200 ml of a 0.1 M $KH_2PO_4$ aqueous solution, stirred at room temperature for 24 hours, and separated, and the separated product is added to 200 ml of a 0.1 M KCl aqueous solution, stirred again at room temperature for 24 hours, and separated.

Preparation Example 5

A mixed metal oxide including Mg, Al, P, and $K[Mg_{0.41}Al_{0.21}P_{0.36}K_{0.02}]O_x$ (wherein x is a number for charge-balancing between oxygen and other elements) is obtained in the same manner as set forth in Preparation Example 1, except that 1 g of the dried precipitate powders are added to 200 ml of a 0.1 M KCl aqueous solution, stirred at room temperature for 24 hours, and then separated, and the separated product is added to 200 ml of a 0.1 M $KH_2PO_4$ aqueous solution, stirred again at room temperature for 24 hours, and separated.

Preparation Example 6

Aluminum nitrate $(Al(NO_3)_3 \cdot 9H_2O)$ and magnesium nitrate $(Mg(NO_3)_2 \cdot 6H_2O)$ as precursors are dissolved in 200 ml of water to prepare a mixed aqueous solution of the metal salts. The amounts of the precursors are controlled so that the mole ratio between the two metals (Al:Mg) is 1:3. In addition, NaOH is dissolved in water to obtain 100 ml of a 1 M NaOH aqueous solution. The aqueous solution of the metal salts is mixed with the NaOH aqueous solution to form precipitates. At this time, the pH is set to be about 9.5 to about 10.5. The precipitates thus formed are aged under vigorous stirring at room temperature of 25° C. for 24 hours. After being aged, the precipitates are filtered through centrifugation (8000 RPM, 10 minutes) and washed with distilled water three times and separated. The separated precipitates are dried for one day. 1 g of the dried precipitate powders are added to 100 ml of a 0.1 M $KH_2PO_4$ aqueous solution and stirred at room temperature for 24 hours to conduct ion-exchange, and then is filtered, washed, and dried at room temperature (25° C.).

Dried powders are calcined in air at 400° C. for 5 hours to prepare a mixed metal oxide including Mg, Al, and P. Distilled water is used after being decarbonated by bubbling nitrogen into the flask to remove $CO_2$.

The mixed metal oxide thus obtained is added to 200 ml of a 7 wt % KCl aqueous solution and stirred therein at 60° C. for 6 hours. Using a rotary evaporator, water is evaporated and the resulting product is separated. The separated product is dried in air at room temperature and recalcined at 400° C. to prepare a mixed metal oxide having a composition of $[Mg_{0.35}Al_{0.16}P_{0.36}K_{0.13}]O_x$ and including KCl crystal.

Comparative Example 1

A mixed metal oxide including Mg, Al, and $K[Mg_{0.732}Al_{0.265}K_{0.003}]O_x$ (wherein x is a number for charge-balancing between oxygen and other elements) is obtained in the same manner as set forth in Preparation Example 1, except that 1 g of the dried precipitate powders are added to 200 ml of a 0.1 M KCl aqueous solution and then subjected to vigorous stirring at room temperature for 24 hours.

Comparative Example 2

Aluminum nitrate $(Al(NO_3)_3 \cdot 9H_2O)$ and magnesium nitrate $(Mg(NO_3)_2 \cdot 6H_2O)$ as precursors are dissolved in 200 ml of water to prepare a mixed aqueous solution. The amount of the precursors are controlled so that the mole ratio between the two metals (Al:Mg) is 1:3. In addition, NaOH is dissolved in water to obtain 100 ml of a 1 M NaOH aqueous solution. The mixed aqueous solution of the metal salts is mixed with the NaOH aqueous solution to form precipitates. At this time, the pH is set to be about 9.5 to about 10.5. The precipitates thus formed are aged under vigorous stirring at room temperature of 25° C. for 24 hours. After being aged, the precipitates are filtered through centrifugation (8000 RPM, 10 minutes) and washed three times with distilled water, and then filtered and dried for one day.

The dried powder is calcined at 400° C. for 5 hours in air to obtain a mixed metal oxide including Mg and Al, $[Mg_{0.75}Al_{0.25}]O_{2.25}$ (wherein x is a number for charge-balancing between oxygen and other elements). Distilled water is used after being decarbonated by bubbling nitrogen into the flask to remove $CO_2$.

The mixed metal oxide thus obtained is added to 200 ml of a 7 wt % KCl aqueous solution and stirred therein at 60° C. for 6 hours. Using a rotary evaporator, water is evaporated and the resulting product is separated. The separated product is dried in air at room temperature and recalcined at 400° C.

Experimental Example 1

Measurement of Pore Diameters and Pore Volumes

BET specific surface areas, pore diameters, and pore volumes are measured for the mixed metal oxide composites of Preparation Examples 1 to 6 and Comparative Examples 1 and 2 by conducting nitrogen adsorption/desorption isothermal reaction with using a Bell SorpMax instrument (manufactured by Bell Japan Co. Ltd.). The results are compiled in Table 1.

Experimental Example 2

Using a Shimadzu ICPS-8100 sequential spectrometer, inductively coupled plasma atomic emission spectroscopy (ICP-AES) analysis is made for each of the mixed metal oxide composites of Preparation Examples 1 to 6 and Comparative Examples 1 and 2. The results are compiled in Table 1.

TABLE 1

| Adsorbent | ICP (wt %) | | | | BET ($m^2/g$) | Pore volume ($cm^3/g$) | Pore diameter (nm) |
| --- | --- | --- | --- | --- | --- | --- | --- |
| | Mg | Al | P | K | | | |
| Prep. Ex. 1 | 19.7 | 12.3 | 13.0 | 0.6 | 130 | 0.577 | 19.31 |
| Prep. Ex. 2 | 21.5 | 8.7 | 14.7 | 1.7 | 103 | 0.632 | 22.50 |
| Prep. Ex. 3 | 19.6 | 7.9 | 18.5 | 2.8 | 103 | 0.691 | 26.77 |
| Prep. Ex. 4 | 14.9 | 9.2 | 18.7 | 2.6 | 120 | 0.555 | 18.55 |
| Prep. Ex. 5 | 17.1 | 9.8 | 19.0 | 1.3 | 129 | 0.452 | 14.04 |
| Prep. Ex. 6 | 14.9 | 7.2 | 19.6 | 8.9 | 83 | 0.499 | 23.92 |
| Comp. Ex. 1 | 30.3 | 12.2 | 0.0 | 0.2 | 154 | 0.239 | 6.20 |
| Comp. Ex. 2 | 29.7 | 12.1 | 0.0 | 6.9 | 61 | 0.232 | 15.13 |

The results of Table 1 confirm that the mixed metal oxides of Preparation Examples 1 to 6 include Mg, Al, P, and K. They also confirm that the mixed metal oxides of Preparation Examples 1 to 6 have large specific surface areas, large pore volumes, and large pore diameters.

Experimental Example 3

An X-ray diffraction (XRD) analysis is made for the mixed metal oxides of Preparation Examples 1 to 6 and Comparative Examples 1 and 2. The X-ray diffraction analysis is performed using a Cu Kα ray as a light source at 40 kV and 40 mA at a scan speed of 0.005° per second.

Figure 2:
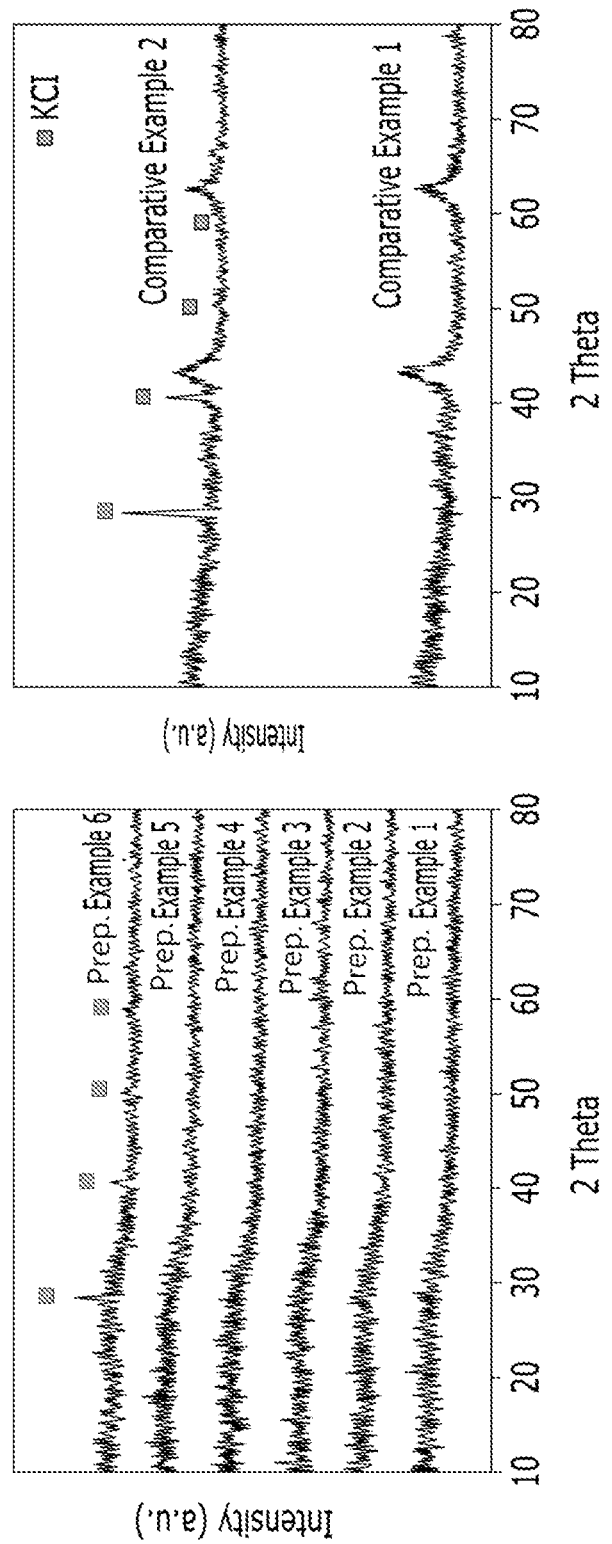
FIG. 2 shows X-ray diffraction spectra of carbon dioxide adsorbents prepared in Preparation Examples 1 to 6 and in Comparative Examples 1 and 2.

The resultant XRD spectrums are shown in FIG. 2, which shows that the mixed metal oxides of Preparation Examples 1 to 6 have an amorphous structure. In case of Preparation Example 6, the presence of the crystalline KCl is also confirmed.

By contrast, it is observed that the mixed metal oxides of Comparative Examples 1 and 2 have no amorphous structure. In case of Comparative Example 2, the presence of the crystalline KCl is confirmed Example 1

Breakthrough Experiment I for Carbon Dioxide Adsorption Capacity (Under Pre-Combustion Conditions)

Quartz columns are respectively filled with the mixed metal oxides prepared in Preparation Examples 1 to 6 and Comparative Examples 1 and 2, and a carbon dioxide adsorption test is carried out under the following conditions to obtain breakthrough curves.

Composition of input gas stream: 40% $CO_2$ + 60% $H_2$
Total flow rate: 200 cc/min
Weight of the mixed metal oxide as filled: 0.1 g
Adsorption temperature and pressure: 200° C. and 1 bar From each of breakthrough curves, a total $CO_2$ adsorption capacity and 90% BT adsorption capacity are calculated and compiled in Table 2.

TABLE 2

| Sample | Total $CO_2$ adsorption capacity (wt %) | 90% BT adsorption capacity (wt %) |
| --- | --- | --- |
| Prep. Ex. 1 | 27.4 | 21.2 |
| Prep. Ex. 2 | 28.5 | 22.6 |
| Prep. Ex. 3 | 29.3 | 24.5 |
| Prep. Ex. 4 | 27.4 | 21.6 |
| Prep. Ex. 5 | 27.7 | 21.6 |
| Prep. Ex. 6 | 27.5 | 21.8 |
| Comp. Ex. 1 | 13.4 | 8.1 |
| Comp. Ex. 2 | 18.2 | 13.1 |

The results of Table 2 confirm that the mixed metal oxide of Preparation Examples 1 to 6 exhibit high adsorption capacity at 200° C.

Example 2

Breakthrough Experiment II for Carbon Dioxide Adsorption Capacity (Under Pre-Combustion Conditions) Considering Thermal Stability Quartz columns are respectively filled with the mixed metal oxides prepared in Preparation Examples 3 and 6, and a carbon dioxide adsorption test is carried out under the following conditions at different temperatures to obtain breakthrough curves therefrom.

Figure 3:
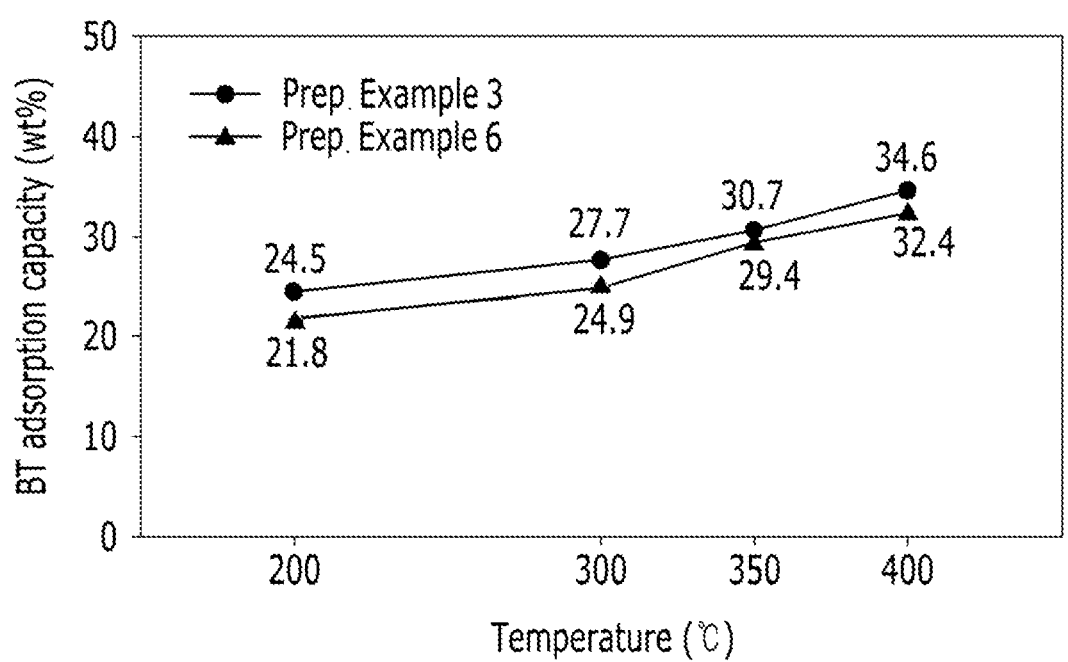
FIG. 3 is a view illustrating the results of a breakthrough experiment for the carbon dioxide adsorption capacity of Example 2 (under a pre-combustion condition).
Figure 4:
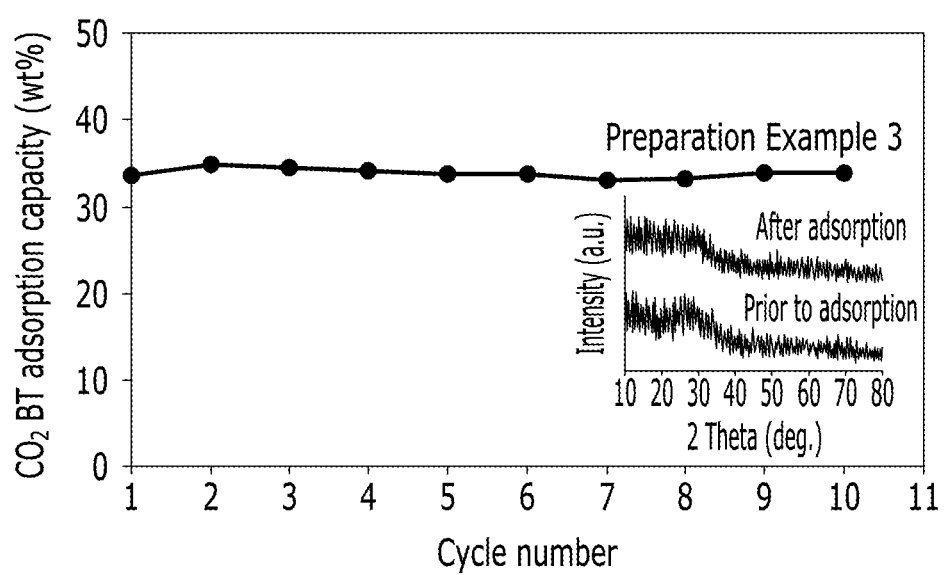
FIG. 4 is a view illustrating the results of a durability test for the mixed oxide of Example 3.

Composition of input gas stream: 40% $CO_2$+60% $H_2$
Total flow rate: 200 cc/min
Weight of the mixed metal oxide as filled: 0.1 g
Adsorption temperature and pressure: 200° C. to 400° C. and 1 bar From each of breakthrough curves, total $CO_2$ adsorption capacity is calculated and the results are shown in FIG. 3. FIG. 3 reveals that the mixed metal oxides of Preparation Examples 3 and 6 have high adsorption capacity of greater than or equal to 20 wt % at a temperature of 200° C. to 400° C.

Example 3

Durability Test for Mixed Metal Oxide (Recycle Tests)

A quartz column is filled with the mixed metal oxide of Preparation Example 3 (showing the highest adsorption capacity), and a carbon dioxide adsorption test (an isothermal recycle test) is carried out under the following conditions to obtain breakthrough curves therefrom.

Composition of input gas stream: 40% $CO_2$+60% $H_2$
Total flow rate: 200 cc/min
Weight of the mixed metal oxide as filled: 0.1 g
Adsorption temperature and pressure: 400° C. and 1 bar During 10 cycles, the mixed metal oxide of Preparation Example 3 shows a 90% BT carbon dioxide adsorption capacity of greater than or equal to 34%, and no decrease in adsorption capacity is observed.

Further, the results of XRD analyses prior to and after the adsorption test confirm that no change in its structure occurred.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. A carbon dioxide adsorbent comprising:
an amorphous mixed metal oxide including a divalent first metal ($M^1$), a trivalent second metal ($M^2$) different from the divalent first metal ($M^1$), an alkali metal ($M^3$), and an element (A) with an electronegativity of about 2.0 to about 4.0, the alkali metal ($M^3$) being present in a form of a crystalline halide, an oxide, or a combination thereof.

2. The carbon dioxide adsorbent of claim 1, wherein the divalent first metal ($M^1$) is selected from an alkaline-earth metal, a transition element, and a combination thereof.

3. The carbon dioxide adsorbent of claim 2, wherein the divalent first metal ($M^1$) is selected from magnesium (Mg), calcium (Ca), strontium (Sr), nickel (Ni), manganese (Mn), iron (Fe), cobalt (Co), copper (Cu), zinc (Zn), beryllium (Be), and a combination thereof.

4. The carbon dioxide adsorbent of claim 1, wherein the trivalent second metal ($M^2$) is selected from a Group 13 element, a transition element, a lanthanide, and a combination thereof.

5. The carbon dioxide adsorbent of claim 4, wherein the trivalent second metal ($M^2$) is selected from aluminum (Al), chromium (Cr), manganese (Mn), iron (Fe), cobalt (Co), lanthanum (La), cerium (Ce), gallium (Ga), indium (In), vanadium (V), and a combination thereof.

6. The carbon dioxide adsorbent of claim 1, wherein a mole ratio ($M^1/M^2$) between the divalent first metal ($M^1$) and the trivalent second metal ($M^2$) is about 1.45/1 to about 4/1.

7. The carbon dioxide adsorbent of claim 1, wherein the element (A) having the electronegativity of about 2.0 to about 4.0 is selected from phosphorus (P), boron (B), fluorine (F), sulfur (S), chlorine (Cl), and a combination thereof.

8. The carbon dioxide absorbent of claim 1, wherein the alkali metal ($M^3$) is Li, Na, K, Rb, Cs, Fr, or a combination thereof.

9. The carbon dioxide adsorbent of claim 1, wherein the amorphous mixed metal oxide is represented by Chemical Formula 1:

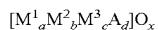  [Chemical Formula 1]

wherein a is about 0.25 to about 0.60, b is about 0.1 to about 0.40, c is about 0 to about 0.30, and d is about 0.05 to about 0.45, a+b+c+d equals 1, and x is a charge balancing quantity between the oxygen (O) and $M^1$, $M^2$, $M^3$, and A.

10. The carbon dioxide adsorbent of claim 1, wherein the crystalline halide of the alkali metal ($M^3$) is supported on a surface of the amorphous mixed metal oxide, and the crystalline halide of the alkali metal ($M^3$) is LiCl, NaCl, KCl, RbCl, CsCl, FrCl, or a combination thereof.

11. The carbon dioxide adsorbent of claim 1, wherein the alkali metal ($M^3$) is present in a range of about 1 to about 30 mole % based on a total amount of the divalent first metal ($M^1$) and the trivalent second metal ($M^2$).

12. A method of producing a carbon dioxide adsorbent, comprising:
dissolving a salt of a divalent first metal ($M^1$) and a salt of a trivalent second metal ($M^2$) in water to prepare a first aqueous solution, the trivalent second metal ($M^2$) being different from the divalent first metal ($M^1$);
adjusting a pH of the first aqueous solution to be basic to form a precipitate;
separating the precipitate; and
performing a first treatment or a second treatment on the precipitate, the first treatment including treating the precipitate with a second aqueous solution of a salt including an element (A) with an electronegativity of about 2.0 to about 4.0 and a third aqueous solution of an alkali metal ($M^3$) salt to form a first ion-exchanged mixed metal hydroxide, separating the first ion-exchanged mixed metal hydroxide, and calcining the first ion-exchanged mixed metal hydroxide to obtain a metal oxide composite, the second treatment including treating the precipitate with the second aqueous solution to form a second ion-exchanged mixed metal hydroxide, separating the second ion-exchanged mixed metal hydroxide, calcining the second ion-exchanged mixed metal hydroxide to obtain a calcined product, and treating the calcined product with the third aqueous solution to obtain the metal oxide composite, the alkali metal ($M^3$) being present in a form of a crystalline halide, an oxide, or a combination thereof.

13. The method of claim 12, wherein the dissolving includes the salt of the divalent first metal ($M^1$) being selected from nitrates, acetates, and hydrates thereof, and the salt of the trivalent second metal ($M^2$) being selected from nitrates, acetates, and hydrates thereof.

14. The method of claim 13, wherein the dissolving includes the divalent first metal ($M^1$) being selected from an alkaline-earth metal, a transition metal, and a combination thereof, and the trivalent second metal ($M^2$) being selected from a Group 13 element, a transition metal, a lanthanide, and a combination thereof.

15. The method of claim 12, wherein the performing a first treatment or a second treatment includes the salt including the element (A) including an anion selected from a phosphate ion ($PO_4^{3-}$), a borate ion ($BO_3^{3-}$), a sulfate ion ($SO_4^{2-}$), a peroxosulfate ion ($S_2O_8^{2-}$), a chloride ion ($Cl^-$), a chlorate ion ($ClO_3^-$), a perchlorate ion ($ClO_4^-$), a fluoride ion ($F^-$), and a combination thereof.

16. The method of claim 15, wherein the performing a first treatment or a second treatment includes the alkali metal ($M^3$) salt including Li, Na, K, Rb, Cs, or Fr, and being a halide, a hydroxide, a nitrate, an acetate, or a hydrate thereof.

17. The method of claim 12, wherein the performing a first treatment or a second treatment includes the second aqueous solution and the third aqueous solution having a pH of less than or equal to about 7.

18. The method of claim 12, wherein the treating the precipitate or the treating the calcined product includes mixing the precipitate of the first treatment or the calcined product of the second treatment with the third aqueous solution to obtain a resulting mixture and stirring the resulting mixture at a temperature of about 20° C. to about 150° C.

19. A method of separating carbon dioxide, comprising:
contacting a gas mixture containing carbon dioxide with a carbon dioxide adsorbent including an amorphous mixed metal oxide composite, the amorphous mixed metal oxide including a divalent first metal ($M^1$), a trivalent second metal ($M^2$) different from the divalent first metal ($M^1$), an alkali metal ($M^3$), and an element (A) with an electronegativity of about 2.0 to about 4.0, the alkali metal ($M^3$) being present in a form of a crystalline halide, an oxide, or a combination thereof.

20. The method of separating carbon dioxide of claim 19, further comprising:
heat-treating the carbon dioxide adsorbent at a temperature of about 50° C. to about 500° C., optionally under a reduced pressure, to desorb the carbon dioxide.

* * * * *